United States Patent [19]

Mitsumune et al.

[11] Patent Number: 4,930,874
[45] Date of Patent: Jun. 5, 1990

[54] LIQUID CRYSTAL DISPLAY DEVICE

[75] Inventors: Toshifumi Mitsumune, Kobe; Hiroshi Take, Ikoma; Kiyoshi Nakazawa, Fujiidera, all of Japan

[73] Assignee: Sharp Kabushiki Kaisha, Osaka, Japan

[21] Appl. No.: 250,696

[22] Filed: Sep. 28, 1988

[30] Foreign Application Priority Data

Dec. 18, 1987 [JP] Japan .................................. 62-322257

[51] Int. Cl.$^5$ ........................... G02F 1/13; G09G 3/00
[52] U.S. Cl. .................................... 350/333; 350/336;
340/811; 73/626
[58] Field of Search ........................ 350/333, 334, 336;
73/618, 626; 340/811, 984

[56] References Cited

U.S. PATENT DOCUMENTS

| | | | |
|---|---|---|---|
| 4,709,992 | 12/1987 | Ueno | 350/333 X |
| 4,781,438 | 11/1988 | Noguchi | 350/333 X |
| 4,818,077 | 4/1989 | Ohwada et al. | 350/333 X |
| 4,822,142 | 4/1989 | Yasui | 350/333 X |

FOREIGN PATENT DOCUMENTS 61-249078 11/1986 Japan .

*Primary Examiner*—Stanley D. Miller
*Assistant Examiner*—Huy K. Mai
*Attorney, Agent, or Firm*—Birch, Stewart, Kolasch & Birch

[57] ABSTRACT

A liquid crystal display device utilizing an insulating substrate, a plurality of transparent electrodes disposed on the insulating substrate in a matrix fashion to form a plurality of pixels, and at least two thin film transistors disposed in the vicinity of each of the transparent electrodes on the insulating substrate, each the thin film transistor having a drain electrode, a source electrode and a gate electrode. The drain electrode is connected to the transparent electrode, a gate electrode line for each line or column of the transparent electrodes is disposed on the insulating substrate in the vicinity thereof and each gate electrode of the thin film transistors connected to each of the transparent electrodes of the line or column are connected in common thereto. The source electrode lines for each column or line of the transparent electrodes are disposed on the insulating substrate in the vicinity thereof and at a right angle to the gate electrode line. The number of the source electrode lines are further equal to the number of the thin film transistors connected to one transparent electrode. Each of the source electrodes of the thin film transistors connected to each of the transparent electrodes of the column or line are thereby connected respectively thereto in a manner capable of connection to an exterior circuit.

9 Claims, 2 Drawing Sheets

LIQUID CRYSTAL DISPLAY DEVICE

BACKGROUND OF THE INVENTION

The present invention relates to a liquid crystal display device, specifically to an active-matrix liquid crystal display device which provides a specific connection structure for a plurality of thin film transistors for driving pixels, the transistors being connected to one of the transparent electrodes which forms the pixel.

In a conventional active-matrix liquid crystal display device, as shown in FIG. 4, one thin film transistor b, for each driving pixel, is connected to each of the transparent electrodes (Indium Tin Oxide) arranged in a matrix fashion to form each pixel. A drain electrode c, of each thin film transistor b, is connected to each transparent electrode a, and each source electrode d is connected to a common source electrode line e on each column of the matrix. Further each gate electrode f is connected to a common gate electrode line g on each row of the matrix, respectively. The above-described transparent electrodes a, thin film transistors b, source electrode lines e on each column, and gate electrode lines g on each row are formed on an insulating substrate h.

In the liquid crystal display device having the above-mentioned structure, the characteristic inspection of the thin film transistor b is conducted by bringing a needle-shaped probe into contact (pressure contact) with the transparent electrode a of the pixel, which is connected to the drain electrode c of the thin film transistor b. Then, a voltage is applied to the source electrode d, which is greater than or equal to a threshold voltage applied to the gate electrode f, and the resulting current flow into the transparent electrode a is measured.

However, with the inspection method described above, it is difficult to test all of the thin film transistors because of the presence of narrow pitches of the transparent electrodes a and because of the large number of pixels. In addition, the contact of the needle-shaped probe and the transparent electrode of the pixel is prone to damage the thin film transistor b, and in the case of a color liquid crystal display device, in inspecting the characteristics of the thin film transistor b, a defect in the pixel would have been judged to have occured by performing black-and-white display, and therefore the manufacturing cost would be high.

Also, in the Japanese Patent Laid-Open Publication No. 61 (1986)-249078, a matrix-type display device is described wherein two thin film transistors are disposed for one pixel electrode, and a bypass is disposed in the source electrode line, and either of the thin film transistors is utilized in a method of correcting a defect caused by a short-circuit between the gate electrode line and the source electrode line, a short-circuit between the source electrode and the drain electrode, a short-circuit between the gate electrode and the drain electrode, or a breaking between the drain electrode and the pixel electrode. Therefore, the reliability of the display device can be secured.

However, in the matrix-type display device as shown in the above-mentioned patent publication, when a defective thin film transistor is separated from the pixel electrode by etching or utilizing a laser cutter, this results in greater time lost and higher costs required for inspection and correction, especially in mass-production.

The present invention has been created in light of the above-mentioned circumstances, and has, as its purpose providing a liquid crystal display device which will allow characteristic inspection of the thin film transistor for a driving pixel without damaging the thin film transistor.

SUMMARY OF THE INVENTION

The present invention relates to a liquid crystal display device comprising (1) an insulating substrate; (2) a plurality of transparent electrodes disposed on the insulating substrate in a matrix fashion to form a plurality of pixels; (3) at least two thin film transistors disposed in the vicinity of each of the transparent electrodes on the insulating substrate, each the thin film transistor having a drain electrode, a source electrode and a gate electrode, in which the drain electrode is connected to the transparent electrode; (4) a gate electrode line for each line or column of the transparent electrodes disposed on the insulating substrate in the vicinity thereof, each the gate electrode of the thin film transistors connected to each of the transparent electrodes of the line or column being connected in common thereto; and (5) source electrode lines for each column of line the transparent electrodes disposed on the insulating substrate in the vicinity thereof and at a right angle to the gate electrode line, the number of the source electrode lines being equal to the number of the thin film transistors connected to one transparent electrode. Each of the source electrodes of the thin film transistors connected to each the transparent electrodes of the column or line being connected respectively thereto in a manner capable of connection to an exterior circuit.

The transparent electrode in the present invention is preferably an indium tin oxide film which is formed by a physical method such as electron beam evaporation, resistance heat evaporation or sputtering, or by a chemical method such as spraying or the CVD method.

Also, for the thin film transistor, a semiconductor material such as polycrystalline silicon, amorphous silicon, Te or CdSe is used, and may be fabricated by a conventional method in this field.

Furthermore, the gate electrode lines and the source electrode lines are preferably formed with metals such as Ta, Mo, Ti or Al.

The gate electrode lines are preferably disposed in the vicinity of the transparent electrodes in parallel to the row direction, and the source electrode lines are preferably disposed in the vicinity of the transparent electrodes in parallel to the column direction, respectively. Here, the word vicinity, as is commonly understood in the field, refers to the necessary spacing between the transparent electrodes and the gate and source electrode lines.

DETAILED DESCRIPTION OF THE PREFERRED EMBODIMENTS

Figure 1:
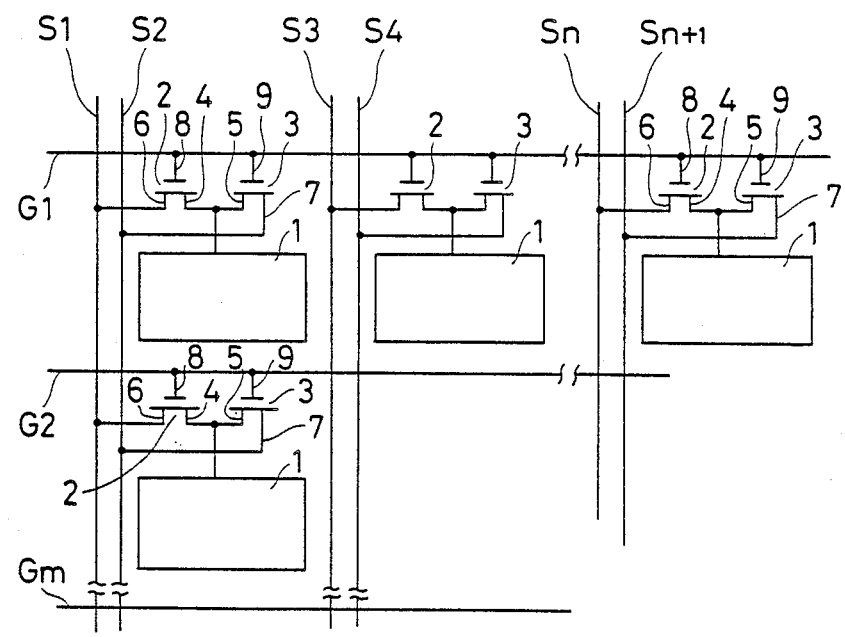
FIG. 1 is a fragmental structural schematic view showing a wiring structure of an embodiment in accordance with the present invention.

In FIG. 1, numeral 1 designates transparent electrodes, which are disposed on an insulating substrate (not illustrated) in a matrix type fashion, for example, a glass substrate to form a plurality of pixels.

For the transparent electrode 1, an ITO (Indium Tin Oxide) film is preferable.

Connected to each transparent electrode 1, are each of the drain electrodes 4 and 5 and a plurality of, for example two, thin film transistors 2 and 3 for the driving pixel, made and disposed on the insulating substrate by a conventional method in this field. Also, source electrodes 6 of the thin film transistors 2, in the direction of the same column, are connected to one common source electrode line S1, and source electrodes 7 of the thin film transistors 3 are connected to a second source electrode line S2. Similarly, the respective thin film transistors 2 and 3 in the column direction of the n-th column are connected to source electrode lines Sn and Sn+1, respectively. This means that the number of source electrode lines is equal to the number of thin film transistors connected to one transparent electrode which are formed on the insulating substrate in a manner capable of connecting the respective source electrodes 6 and 7 to an exterior circuit which will be described later. Each of the source electrode lines S1, S2, ..., Sn, Sn+1 is disposed in the vicinity of a column constituted with the respective transparent electrodes 1 in parallel to the direction of that column, with the width separation preferably about 10–about 15 $\mu$m.

Furthermore, gate electrodes 8 and 9 of the respective transistors 2 and 3 arrayed in the direction of the same row, are connected to one of the gate electrode lines G1, G2, ..., Gm. They are disposed on each row in the vicinity of the respective transparent electrodes 1 which run parallel to the gate electrode lines. Accordingly, the respective source electrode lines S1, S2, ..., Sn, Sn+1 are orthogonal to the respective gate electrode lines G1, G2, ..., Gm.

The respective thin film transistors 2 and 3 are formed between the transparent electrodes 1 of the respective rows and the gate electrode lines G1, G2, ..., Gm of the respective rows.

Figure 2:
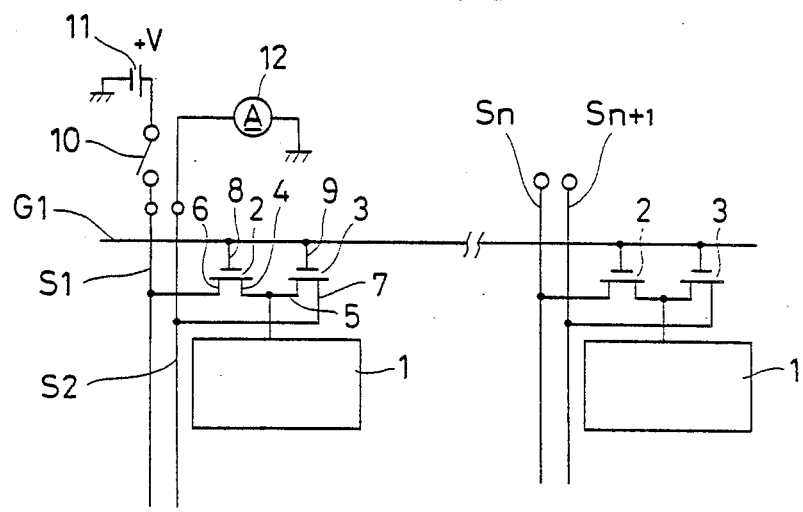
FIG. 2 is an electric wiring diagram for explaining a method of inspecting the characteristics of a thin film transistor of the embodiment.

Next, description is made of a method of inspecting characteristics of the thin film transistors 2 and 3 in this embodiment in reference to FIG. 2.

As shown in FIG. 2, a voltage for driving thin film transistors is applied from an exterior circuit to the gate electrode line G1 which is connected to the gate electrodes 8 and 9 of the thin film transistors to be tested. At this location on the first column, a power source 11 of a voltage of +V is connected to the source electrode line S1 through an external switch 10. Then, an ammeter 12 is connected to the source electrode line S2.

In the above-mentioned state, if the thin film transistors 2 and 3 are normal, a current flows from the source electrode 6 of the thin film transistor 2 to the drain electrode 4, and further flows from the drain electrode 5 of the thin film transistor 3 to the source electrode 7. Accordingly, the ammeter 12 connected to the source electrode line S2 should indicate a predetermined current value. Contrary to the above-mentioned scenario, if either or both of the thin film transistors 2 and 3 are defective, the ammeter 12 does not indicate the predetermined current value, and therefore the abnormal (defective) thin film transistors 2 and/or 3 are detected.

Similarly, testing the thin film transistors 2 and 3 of the first column can be conducted by applying the voltage for driving thin film transistors applied to the gate electrode line G1 sequentially to the gate electrode lines G2, ..., Gm from the above-mentioned state of connection in a switching-over fashion. Furthermore, the power source 11 and the ammeter 12 are connected to the respective source electrode lines S3, S4, ..., Sn, Sn+1 in a sequential switching-over fashion, and as mentioned above, the voltage for driving thin film transistors is applied to the gate electrode lines G1, G2, ..., Gm in a sequential switching-over fashion. Therefore, the characteristic inspection of all the thin film transistors 2 and 3 can be conducted.

Figure 3:
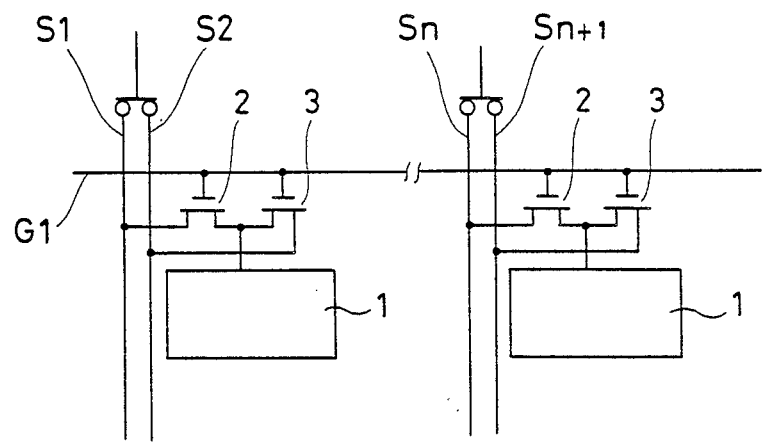
FIG. 3 is a fragmental structural schematic view showing the final connection structure of the source electrode lines of the embodiment.
Figure 4:
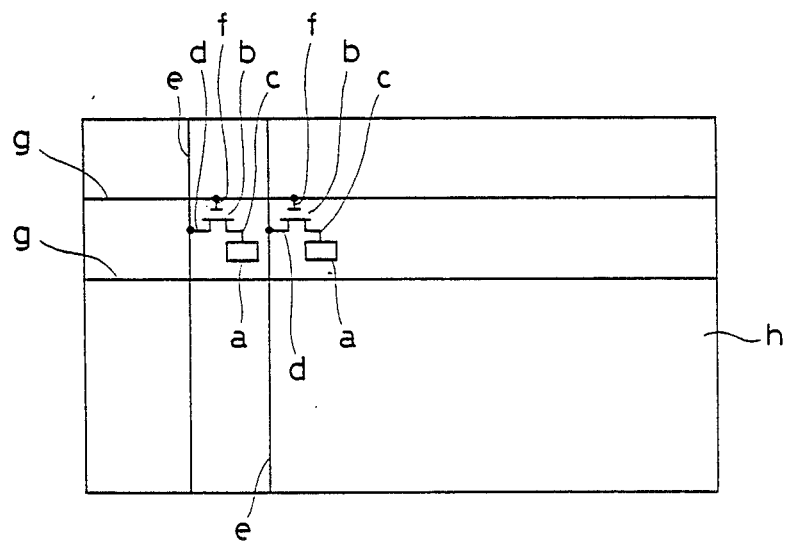
FIG. 4 is a partial structural schematic view of prior art.

As shown in FIG. 3, after completing the characteristc inspection, two of the source electrode lines S1, S2, S3, S4, ..., Sn, Sn+1, which form a pair on each column, are short-circuited, and thereby two thin film transistors 2 and 3 for the driving pixel are connected to one transparent electrode.

In addition, in the above-mentioned embodiment, the case with two thin film transistors is described, however the number of the thin film transistors may be three or more. In that case, the drain electrodes of the respective transistors are connected to the transparent electrode, and the source electrodes are connected separately to the source electrode lines. Then, in conducting the characteristic inspection of the thin film transistor, the voltage is applied to one source electrode line, and the ammeters are connected to the rest of the source electrode lines, and thereby characteristics of a plurality of thin film transistors connected to one transparent electrode can be inspected by the same method.

Therefore, in accordance with the present invention, the testing of the thin film transistor for the driving pixel can be easily conducted without damaging the thin film transistor. If the characteristics of even one or more of the thin film transistors connected to one transparent electrode is at a certain level or greater, a liquid crystal display device can be made which does not produce a point defect and does not diminish the quality of its display.

What is claimed is:

1. A liquid crystal display device comprising:
   an insulating substrate;
   a plurality of transparent electrodes disposed on the insulating substrate in a matrix fashion to thereby form a plurality of pixels arranged in columns and rows;
   a plurality of thin film transistors (TFT) connected to each of the transparent electrodes on the insulating substrate, each thin film transistor having a drain electrode, a source electrode and a gate electrode, in which the drain electrode of each TFT is connected to its corresponding transparent electrode;
   a common gate electrode line for each row of transparent electrodes disposed on the insulating substrate, each gate electrode of the thin film transistors connected to each of the transparent electrodes in each row being connected in common thereto; and
   a plurality of source electrode lines for each column of the transparent electrodes disposed at a right angle to the common gate electrode lines on the insulating substrate the number of the source electrode lines for each column being equal to the number of the thin film transistors connected to one transparent electrode, wherein the thin film transistors connected to each transparent electrode of each column being connected to a different of said plurality of source electrode lines of each respective column.

2. A liquid crystal display device as claimed in claim 1, wherein each transparent electrode is composed of an indium tin oxide film.

3. A liquid crystal display device as claimed in claim 1, wherein the common gate electrode lines are provided in parallel to the transparent electrode row direction, and the common source electrode lines are provided in parallel to the transparent electrode column direction.

4. A liquid crystal display device as claimed in claim 3, wherein each transparent electrode is composed of an indium tin oxide film.

5. A method of checking for defective transistors in a liquid crystal display device comprising;
an insulating substrate,
a plurality of transparent electrodes disposed on said substrate forming a plurality of rows and columns in a matrix type fashion,
a plurality of thin film transistors connected to each of said plurality of transparent electrodes, each thin film transistor having a drain electrode, a gate electrode and a source electrode, wherein said drain electrode of each thin film transistor is connected to its corresponding transparent electrode,
a plurality of common gate lines, one for each row of transparent electrodes, for commonly connecting the gate electrodes of all transistors corresponding to each row of transparent electrodes,
a plurality of common source lines for each column of transparent electrodes, the number of common source lines for each column being equal to the number of thin film transistors connected to each transparent electrode, wherein the source electrode of each thin film transistor corresponding to each column of transparent electrodes is connected to a different of said plurality of common source lines in each respective column, said method comprising the steps of:
(a) applying a threshold voltage to a common gate line in a row corresponding to transistors to be checked for defect;
(b) applying a voltage, greater in magnitude than said threshold voltage, to one of said common source lines in a column corresponding to transistors to be checked for defect;
(c) connecting an ammeter to a different one of said common source lines in a column corresponding to transistors to be checked for defect and detecting a defect in one or more of said transistors checked if said ammeter registers a current value less than that of a predetermined value.

6. A liquid crystal display device comprising;
an insulating substrate;
a plurality of transparent electrodes disposed on said substrate in a plurality of rows and columns, in a matrix fashion;
driving means for driving said plurality of transparent electrodes comprising,
a plurality of thin film transistors connected to each of said plurality of transparent electrodes, each transistor having a gate electrode, a source electrode, and a drain electrode;
common gate lines for connecting each of the gate electrodes of each thin film transistor, corresponding to each row of transparent electrodes, to a common gate line; and
a plurality of common source lines for each column of transparent electrodes, equal in number to the number of thin film transistors connected to each of said transparent electrodes, wherein each transistor corresponding to a transparent electrode in each column is connected to a different of said plurality of common source lines and wherein the plurality of common source lines, for each column, are short circuited together.

7. A liquid crystal display device as claimed in claim 6, wherein each transparent electrode is composed of an indium tin oxide film.

8. A liquid crystal display device as claimed in claim 6, wherein the common gate lines are provided in parallel to the transparent electrode row direction, and the common source lines are provided in parallel to the transparent electrode column direction.

9. A liquid crystal display device as claimed in claim 8, wherein each transparent electrode is composed of an indium tin oxide film.

* * * * *